(12) United States Patent
Kitchin et al.

(10) Patent No.: US 9,317,100 B2
(45) Date of Patent: Apr. 19, 2016

(54) ACCELERATED CACHE RINSE WHEN PREPARING A POWER STATE TRANSITION

(71) Applicant: ADVANCED MICRO DEVICES, INC., Sunnyvale, CA (US)

(72) Inventors: Paul E. Kitchin, Austin, TX (US); William L. Walker, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 297 days.

(21) Appl. No.: 13/738,378

(22) Filed: Jan. 10, 2013

(65) Prior Publication Data

US 2014/0195832 A1 Jul. 10, 2014

(51) Int. Cl.
*G06F 12/00* (2006.01)
*G06F 1/32* (2006.01)
*G06F 12/08* (2006.01)

(52) U.S. Cl.
CPC .......... *G06F 1/3243* (2013.01); *G06F 12/0804* (2013.01); *G06F 2212/1032* (2013.01); *Y02B 60/1225* (2013.01)

(58) Field of Classification Search
CPC . G06F 12/00; G06F 12/0859; G06F 12/0868; G06F 12/0871; G06F 12/12
USPC .................. 711/100, 117, 118, 133, 154, 200
See application file for complete search history.

(56) References Cited

U.S. PATENT DOCUMENTS 7,941,683 B2 * 5/2011 Branover et al. ............. 713/323
2014/0095794 A1 * 4/2014 Moses et al. .................. 711/128

* cited by examiner

*Primary Examiner* — Tuan Thai

(57) ABSTRACT

Methods, integrated circuit devices, and fabrication processes relating to power management transitions of a compute unit comprising a cache are presented. One method includes, responsive to an indication that the compute unit is attempting to enter a low power state, detecting at least one line of the cache differing from the corresponding line in memory, writing differing data from the at least one differing line to the memory, flushing at least one remaining differing line of the cache, and permitting the compute unit to enter the low power state, wherein the detecting and the writing are performed at a first frequency prior to the indication and at a second frequency subsequent the indication, and the second frequency is higher than the first frequency.

23 Claims, 3 Drawing Sheets

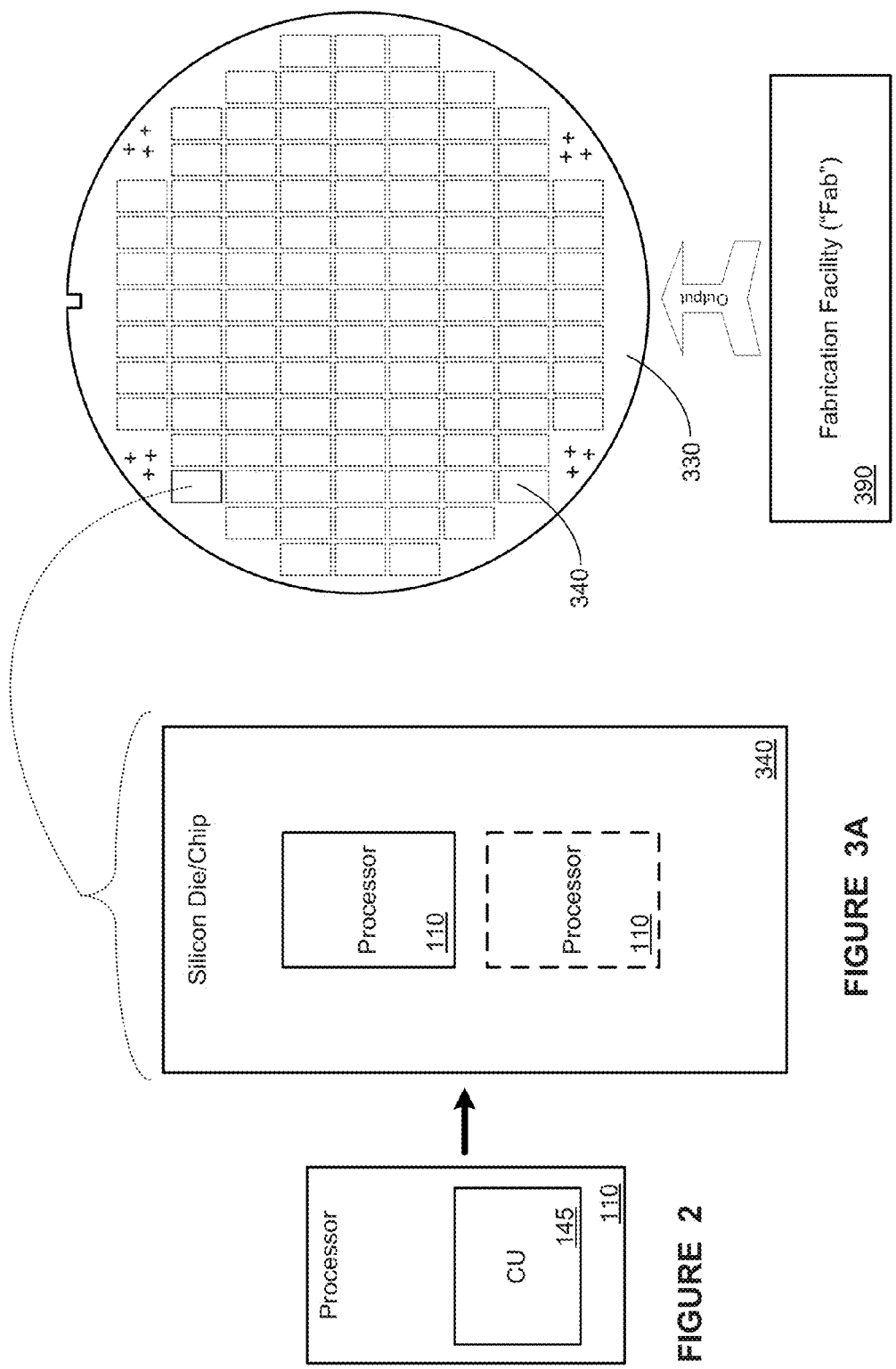

ACCELERATED CACHE RINSE WHEN PREPARING A POWER STATE TRANSITION

BACKGROUND

1. Technical Field

Generally, the disclosed embodiments relate to integrated circuits, and, more particularly, to power management of a compute unit comprising a cache.

2. Description of the Related Art

A computer system comprising a compute unit (e.g., a core of a multi-core central processing unit (CPU)) can place the compute unit into a lower power state when it is not needed to perform user- or system-requested operations. Placing an unneeded compute unit into a lower power state may reduce power consumption and heat generation by the computer system, thereby reducing operating expenses of the computer system and extending the service life of the computer system or components thereof. It is common for a computer system to contain a central power management unit (PMU) to orchestrate the low power transitions for compute unit(s) and/or other components within the system. Typically, the PMU can make requests directly to a compute unit to power down and power up.

A compute unit may have a cache. Typically, a cache is used to store copies of data from frequently used locations of main memory. It is generally quicker for the compute unit to access data in the cache than the corresponding copies in main memory. As a result, data stored in a cache may differ from the corresponding copy in main memory. A cache line containing differing data may be termed "modified" or "dirty," depending on, among other considerations, which cache coherency protocol may be implemented by the computer system comprising the compute unit, whereas a cache line containing data identical to the corresponding copy in main memory may be termed "unmodified" or "clean."

When a compute unit is directed to power down, one issue to be addressed is the status of the cache. Commonly, when a compute unit is directed to power down, the compute unit will save off its architectural state to some memory retention area, flush its caches of all differing data (i.e., complete any writing of differing data from cache locations to main memory and evict the differing data from the cache), and then signal its low power readiness to the PMU. However, depending on the amount of differing data in the cache, the process of flushing the cache may be the most time-consuming part of the power-down process. For example, saving off the compute unit architectural state to memory (such as, but not necessarily, main memory) may take 3000-5000 clock cycles, whereas flushing a cache may take about two to five clock cycles per differing cache line. It is not uncommon for a cache to have tens of thousands of differing cache lines and require ~50,000 clock cycles (~50 μsec in contemporary desktop computer processors) to be completely flushed. The time spent on cache flushing is time that the compute unit is powered up but relatively inactive and thus wasting power and generating unnecessary heat.

SUMMARY OF EMBODIMENTS

The apparatuses, systems, and methods in accordance with the embodiments disclosed herein may facilitate power management of a compute unit by reducing the number of dirty cache lines that must be flushed, thereby allowing quicker powering down of the compute unit. Mechanisms controlling and implementing such a process may be formed within a microcircuit by any means, such as by growing or deposition.

Some embodiments provide an integrated circuit device that includes a compute unit comprising a cache, wherein the compute unit is configured to indicate it is attempting to enter a low power state and flush at least one modified line of the cache subsequent the indication; a power management unit configured to permit the compute unit to enter the low power state; and a cache rinser configured to detect at least one line of the cache that differs from a corresponding line in a memory and write differing data from the at least one differing line to the memory, wherein the cache rinser is configured to detect and write at a first frequency prior to the indication by the compute unit and at a second frequency subsequent the indication, and the second frequency is higher than the first frequency.

Some embodiments provide a method that includes detecting at least one line of a cache of a compute unit that differs from a corresponding line in a memory; writing differing data from the at least one differing line of the cache to the memory; and flushing at least one remaining line of the cache that differs from a corresponding line in the memory; wherein the detecting and the writing are performed at a first frequency when the compute unit is in a high power state and at a second frequency in response to the compute unit attempting to enter a low power state; and the second frequency is higher than the first frequency.

The embodiments described herein may be used in any type of integrated circuit that uses a compute unit comprising a cache, and a power management unit. One example is a general purpose microprocessor.

BRIEF DESCRIPTION OF THE FIGURES

The disclosed subject matter will hereafter be described with reference to the accompanying drawings, wherein like reference numerals denote like elements, and:

FIG. 2 is a schematic diagram of a central processing unit depicted in FIG. 1, in accordance with some embodiments.

FIG. 3A provides a representation of a silicon die/chip that includes one or more circuits as shown in FIG. 2, in accordance with some embodiments.

FIG. 3B provides a representation of a silicon wafer which includes one or more dies/chips that may be produced in a fabrication facility, in accordance with some embodiments.

Figure 1:
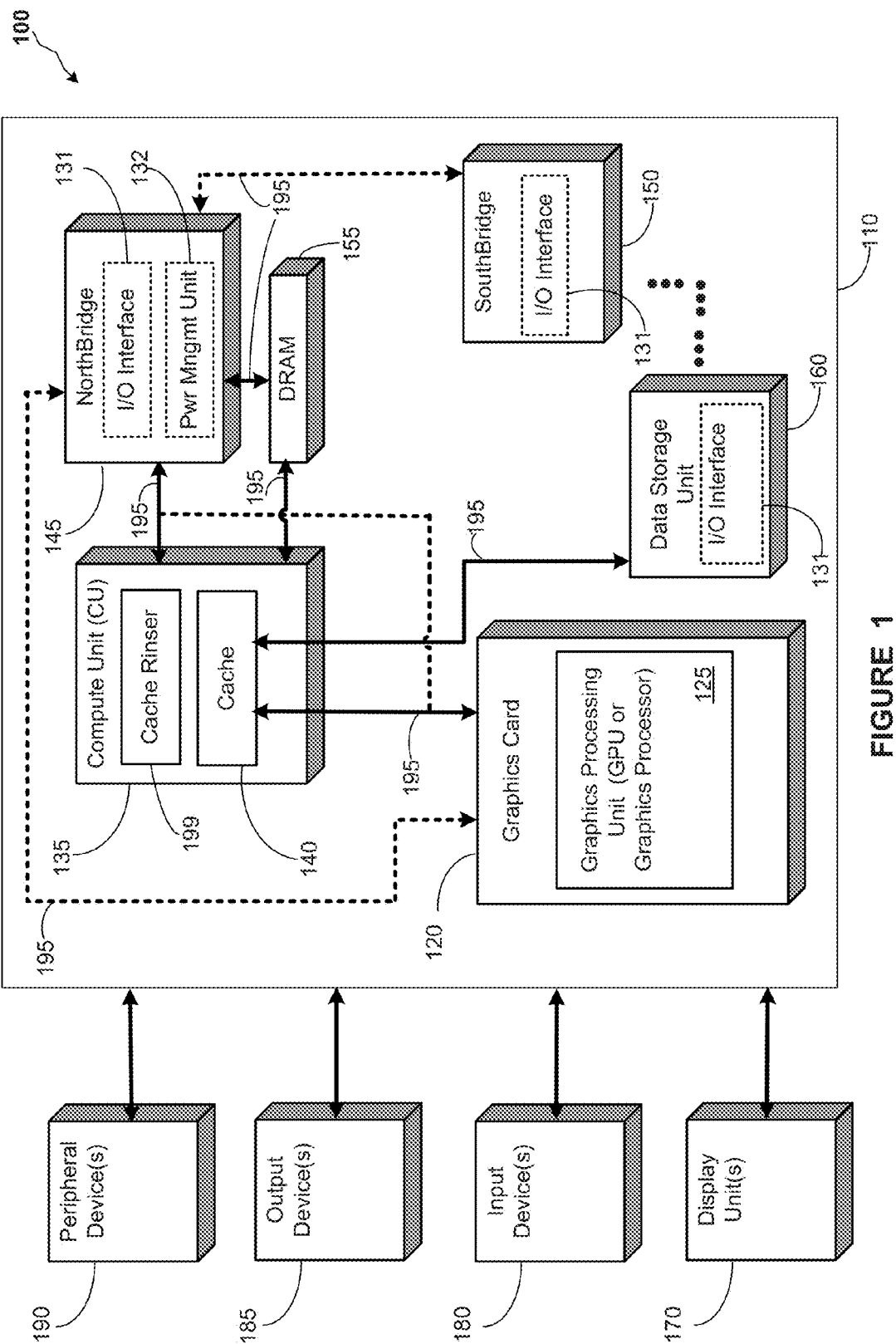
FIG. 1 is a schematic diagram of an exemplary microcircuit design in accordance with some embodiments.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION

Embodiments provide for expedited powering down of a compute unit comprising a cache. Because the cache must be flushed before powering down the compute unit, reducing the number of differing cache lines speeds up the flushing. Thereby, powering down the compute unit may be performed more quickly.

Turning now to FIG. 1, a block diagram representation of a computer system comprising a processor, in accordance with some embodiments, is illustrated. Modern computer systems may exist in a variety of forms, such as telephones, tablet computers, desktop computers, laptop computers, servers, smart televisions, or other consumer electronic devices. The processor unit 110 may comprise one or more compute units (CUs) 135. Each compute unit 135 may comprise a cache 140 that provides readily-accessible storage of data found in frequently-accessed locations in main memory (e.g., DRAM 155).

The computer system 100 may also comprise a northbridge 145. Among its various components, the northbridge 145 may comprise a power management unit (PMU) 132 that may regulate the amount of power consumed by compute unit 135, GPU 125, and/or other elements. Particularly, in response to changes in demand for the compute unit 135, GPU 125, and/or other elements, the PMU 132 may request compute unit 135, GPU 125, and/or another element to enter a low power state, exit the low power state, enter a normal power state, or exit the normal power state.

The computer system 100 may also comprise a main memory, such as a DRAM 155. The DRAM 155 may be configured to store one or more states of one or more components of the computer system 100. Particularly, the DRAM 155 may be configured to store one or more states of the compute unit 135 and/or one or more states of GPU 125. For example, the DRAM 155 may be configured to store an architectural state of compute unit 135. In addition, the DRAM 155 may be configured to store data accessible by and used in operations by compute unit 135. The data stored in DRAM 155 may be copied to cache 140, and operations of compute unit 135 may be performed on the data copies in cache 140. However, as a result of operations of compute unit 135, cache lines within cache 140 may contain data different from the original copies stored in DRAM 155.

The computer system 100 may also comprise a cache rinser 199. Typically, during standard, normal power operations of compute unit 135, the cache rinser 199 detects at least one differing line of the cache 140 and writes differing data from the at least one differing line to the memory (e.g., DRAM 155). In some embodiments, the cache rinser 199 writes without evicting the at least one differing line from the cache 140. During normal power operations of compute unit 135, the cache rinser 199 detects and writes at a first frequency, by which is meant, it scans a certain number of cache lines for differing from the corresponding line in the memory, and writes differing data from each differing line to memory, per unit time. Writing differing data from a differing line to memory removes the difference of the cache line. Generally, the first frequency is less than a maximum frequency. In other words, during normal power operations of the compute unit 135, the cache rinser 199 generally performs fewer detections and writes than it theoretically could in the unit time. This is typically desirable to reduce the consumption of bandwidth in a data channel 195 between the compute unit 135 and the memory (e.g., DRAM 155) by cache rinsing instead of memory access more directly relevant to operations of the compute unit 135.

After the compute unit 135 indicates it is attempting to enter a low power state, the compute unit 135 may handshake with the PMU 132 and may store its architectural state in memory (e.g., DRAM 155, among other memories, such as a higher level cache of the compute unit). In a processor with multiple cache types, e.g. an L1 cache and an L2 cache, storing the architectural state of compute unit 135 may involve writing to and reading from L1 cache, whereas detecting and writing by the cache rinser 199 may involve reading from L2 cache. Because the compute unit 135 is not performing normal operations requiring access to memory (e.g., DRAM 155) during the process of writing its architectural state to L1 cache, the cache rinser 199 may be allowed to consume much, most, or essentially all bandwidth in a data channel 195 between the compute unit 135 and the memory (e.g., DRAM 155). Therefore, subsequent the indication and prior to completion of the storing of the architectural state, the cache rinser 199 may detect and write at a second frequency higher than the first frequency. In particular embodiments, the second frequency is the maximum frequency at which the cache rinser 199 could operate.

The computer system 100 may as a routine matter comprise other known units and/or components, e.g., one or more I/O interfaces 131, a southbridge 150, a data storage unit 160, display unit(s) 170, input device(s) 180, output device(s) 185, and/or peripheral devices 190, among others.

The computer system 100 may also comprise one or more data channels 195 for communication between one or more of the components described above.

Turning now to FIG. 2 and FIG. 3A, in some embodiments, the processor unit 110 may reside on a silicon die/chip 340. The silicon die/chip 340 may be housed on a motherboard or other structure of the computer system 100. In some embodiments, there may be more than one processor unit 110 on each silicon die/chip 340. Some embodiments of the processor unit 110 may be used in a wide variety of electronic devices.

Turning now to FIG. 3B, in accordance with some embodiments, and as described above, the processor unit 110 may be included on the silicon chip/die 340. The silicon chip/die 340 may contain one or more different configurations of the processor unit 110. The silicon chip/die 340 may be produced on a silicon wafer 330 in a fabrication facility (or "fab") 390. That is, the silicon wafer 330 and the silicon die/chip 340 may be referred to as the output, or product of, the fab 390. The silicon chip/die 340 may be used in electronic devices.

The circuits described herein may be formed on a semiconductor material by any known means in the art. Forming can be done, for example, by growing or deposition, or by any other means known in the art. Different kinds of hardware descriptive languages (HDL) may be used in the process of designing and manufacturing the microcircuit devices. Examples include VHDL and Verilog/Verilog-XL. In some embodiments, the HDL code (e.g., register transfer level (RTL) code/data) may be used to generate GDS data, GDSII data and the like. GDSII data, for example, is a descriptive file format and may be used in some embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage device (e.g., data storage units, RAMs, compact discs, DVDs, solid state storage and the like) and, in some embodiments, may be used to configure a manufacturing facility (e.g., through the use of mask works) to create devices capable of embodying various aspects of some embodiments. As understood by one or ordinary skill in the art, this data may be programmed into a computer, processor, or controller, which may then control, in whole or part, the operation of a semiconductor manufacturing facility (or fab) to create semiconductor products and devices. In other words, some embodiments relate to a non-transitory computer-readable medium storing instructions executable by at least one processor to fabricate an integrated circuit. These tools may be used to construct the embodiments described herein.

Figure 4:
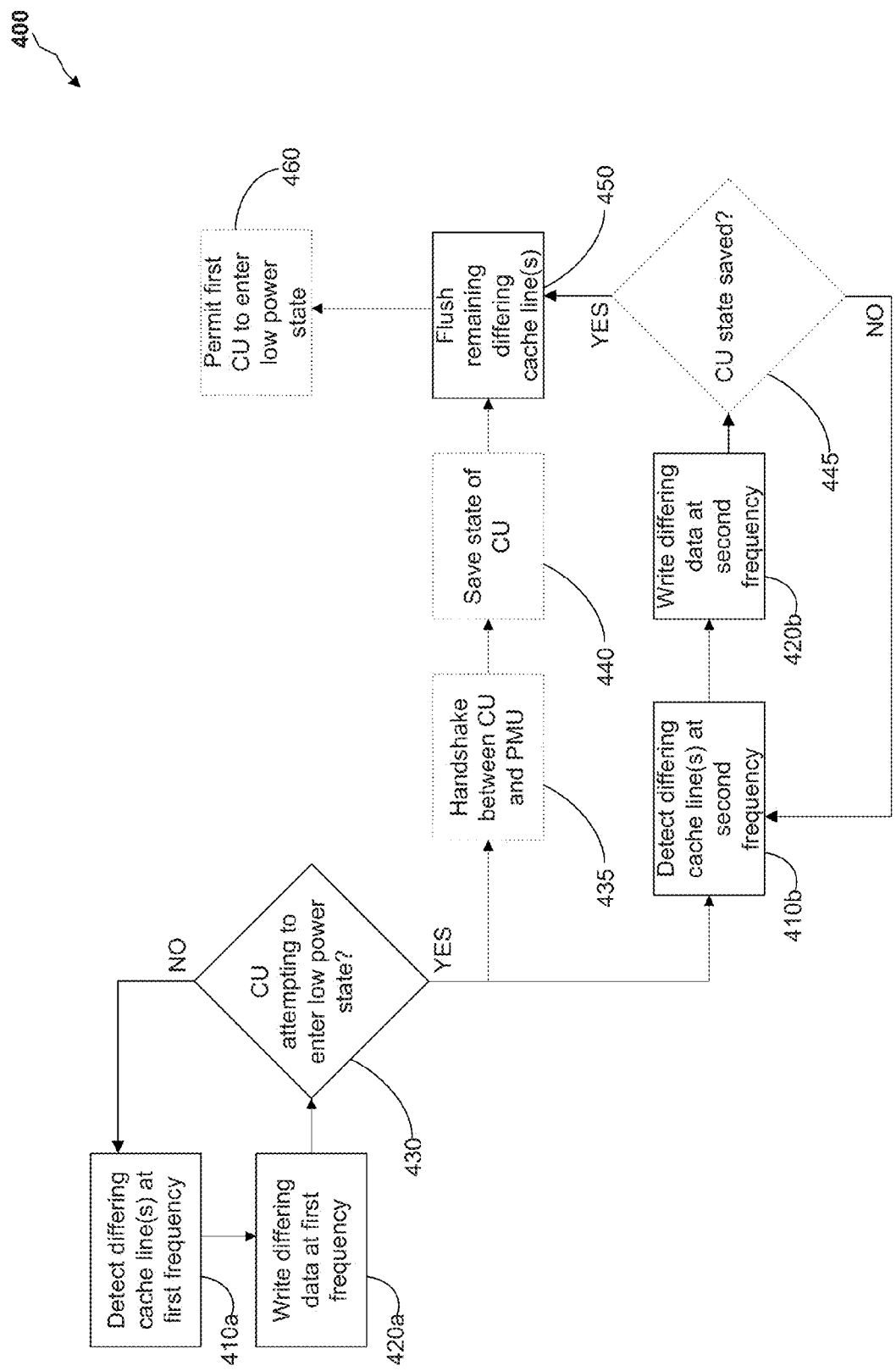
FIG. 4 is a flowchart of a method relating to powering down a compute unit comprising a cache, in accordance with some embodiments.

FIG. 4 presents a flowchart depicting a method 400 according to some embodiments. As illustrated in FIG. 4, the method 400 may comprise: on an ongoing basis, such as during normal operation of a compute unit, wherein the compute unit comprises a cache, detecting at 410a at least one differing line of a cache and writing at 420a differing data from the at least one differing line to a memory. The method may loop through the cache, detecting at 410a and writing at 420a on a line by line basis. The detecting at 410a and the writing at 420a may be performed at a first frequency. The first frequency is typically lower than the maximum frequency theoretically possible using hardware/software/firmware of a computer system comprising the compute unit.

Periodically and/or in response to receiving an interrupt, the method may consider at 430 whether the compute unit is attempting to enter a low power state. As discussed above, for the compute unit to enter the low power state, it may be necessary to perform additional actions, such as saving at 440 an architectural state of the compute unit to a memory. Depending on the properties of the compute unit and/or a power management unit, in some embodiments, the method 400 may further comprise handshaking at 435 between the compute unit and a power management unit in response to an indication the compute unit is attempting to enter the low power state.

If the check at 430 indicates the compute unit will remain in a normal operation (e.g., a high power) state, flow may return to the detecting at 410a and the writing at 420a.

In response to an indication the compute unit is attempting to enter the low power state, detecting at 410b and writing at 420b may be performed at a second frequency, wherein the second frequency is higher than the first frequency. In other words, the same activities of 410a and 420a may be performed, but at a higher frequency. In some embodiments, the second frequency is the maximum frequency referred to above.

In some embodiments, writing at 420a and/or 420b is performed without evicting the at least one differing line from the cache.

Periodically and/or in response to receiving an interrupt, if the architectural state of the compute unit is saved at 440, the method may consider at 445 whether saving at 440 has been completed. If not, flow may return to detecting at 410b and writing at 420b, i.e., at the second frequency. If any saving at 440 has been completed, or if no saving at 440 was performed, the method 400 may further comprise flushing at 450 at least one remaining differing line of the cache. Typically, but not necessarily, flushing at 450 may comprise flushing all remaining differing lines of the cache. By detecting at 410b and writing at 420b at the second frequency, the number of remaining differing lines of the cache subsequent the handshaking at 435, the saving at 440, and/or any other activities preparatory for entry of the compute unit into the low power state that may be performed in parallel with detecting at 410b and writing at 420b, may be reduced relative to the number that would have remained had detecting at 410a and writing at 420a been continued at the first frequency. Thereby, the time required for flushing at 450 may be reduced. Once the at least one, such as all remaining, differing cache line(s) are flushed at 450, the method 400 may comprise permitting at 460 the compute unit to enter the low power state.

The methods illustrated in FIG. 4 may be governed by instructions that are stored in a non-transitory computer readable storage medium and that are executed by at least one processor of the computer system 100. Each of the operations shown in FIG. 4 may correspond to instructions stored in a non-transitory computer memory or computer readable storage medium. In various embodiments, the non-transitory computer readable storage medium includes a magnetic or optical disk storage device, solid state storage devices such as flash memory, or other non-volatile memory device or devices. The computer readable instructions stored on the non-transitory computer readable storage medium may be in source code, assembly language code, object code, or other instruction format that is interpreted and/or executable by one or more processors.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:

1. A method, comprising:
    detecting at least one line of a cache of a compute unit that differs from a corresponding line in a memory;
    writing differing data from the at least one differing line of the cache to the memory; and
    flushing at least one remaining line of the cache that differs from a corresponding line in the memory;
        wherein the detecting and the writing are performed at a first frequency when the compute unit is in a high power state and at a second frequency in response to the compute unit attempting to enter a low power state; and the second frequency is higher than the first frequency.

2. The method of claim 1, further comprising saving an architectural state of the compute unit to a memory, in response to the compute unit attempting to enter the low power state.

3. The method of claim 2, wherein the detecting and the writing are performed at the second frequency prior to completion of the saving.

4. The method of claim 2, wherein the memory is a main memory.

5. The method of claim 1, further comprising handshaking between the compute unit and a power management unit in response to the compute unit attempting to enter the low power state.

6. The method of claim 1, wherein the writing is performed without evicting the at least one differing line from the cache.

7. The method of claim 1, wherein the second frequency is a maximum frequency.

8. The method of claim 1, wherein the at least one differing cache line is a modified cache line.

9. The method of claim 1, wherein the at least one differing cache line is a dirty cache line.

10. An apparatus, comprising:
    a compute unit comprising a cache, wherein the compute unit is configured to indicate it is attempting to enter a low power state and flush at least one modified line of the cache subsequent the indication;
    a power management unit configured to permit the compute unit to enter the low power state; and
    a cache rinser configured to detect at least one line of the cache that differs from a corresponding line in a memory and write differing data from the at least one differing line to the memory, wherein the cache rinser is configured to detect and write at a first frequency prior to the indication by the compute unit and at a second frequency subsequent the indication, and the second frequency is higher than the first frequency.

11. The apparatus of claim 10, wherein the memory is configured to store at least an architectural state of the compute unit and at least one line of the cache.

12. The apparatus of claim 11, wherein the cache rinser is further configured to detect and write at the second frequency prior to completion of the storing of the architectural state.

13. The apparatus of claim 11, wherein the compute unit and the power management unit are further configured to handshake subsequent the indicating and prior to the storing of the architectural state.

14. The apparatus of claim 10, wherein the cache rinser is configured to write the differing data without evicting the at least one differing line from the cache.

15. The apparatus of claim 10, wherein the second frequency is the maximum frequency of the cache rinser.

16. The apparatus of claim 10, wherein the at least one differing cache line is a modified cache line.

17. The apparatus of claim 10, wherein the at least one differing cache line is a dirty cache line.

18. A non-transitory computer-readable medium storing instructions executable by at least one processor to fabricate an apparatus, the apparatus comprising:
a compute unit comprising a cache, wherein the compute unit is configured to indicate it is attempting to enter a low power state and flush at least one modified line of the cache subsequent the indication;
a power management unit configured to permit the compute unit to enter the low power state; and
a cache rinser configured to detect at least one line of the cache differing from a corresponding line in a memory and write differing data from the at least one differing line to the memory, wherein the cache rinser is configured to detect and write at a first frequency prior to the indication by the compute unit and at a second frequency subsequent the indication, wherein the second frequency is higher than the first frequency.

19. The non-transitory computer readable storage medium of claim 18, wherein the compute unit and the power management unit are further configured to handshake subsequent the indicating.

20. The non-transitory computer readable storage medium of claim 18, wherein the cache rinser is configured to write the differing data without evicting the at least one differing line from the cache.

21. The non-transitory computer readable storage medium of claim 18, wherein the second frequency is the maximum frequency of the cache rinser.

22. The non-transitory computer readable storage medium of claim 18, wherein the at least one differing cache line is a modified cache line.

23. The non-transitory computer readable storage medium of claim 18, wherein the at least one differing cache line is a dirty cache line.

* * * * *